United States Patent [19]

Bloch

[11] 4,445,648

[45] May 1, 1984

[54] SAFETY DEVICE FOR VEHICLES

[75] Inventor: Willi Bloch, Velpke, Fed. Rep. of Germany

[73] Assignee: Volkswagenwerk Aktiengesellschaft, Wolfsburg, Fed. Rep. of Germany

[21] Appl. No.: 364,194

[22] Filed: Mar. 31, 1982

[30] Foreign Application Priority Data

Apr. 24, 1981 [DE] Fed. Rep. of Germany ....... 3116355

[51] Int. Cl.³ ...................... B65H 75/48; A62B 35/02
[52] U.S. Cl. .......................... 242/107.6; 242/107.4 B;
280/806; 280/807; 297/478
[58] Field of Search ............. 242/107.6, 107.7, 107.12,
242/107.4 R, 107.4 A, 107.4 B; 297/475, 476,
477, 478, 479, 480; 280/803

[56] References Cited

U.S. PATENT DOCUMENTS 3,682,412 8/1972 Kuszynski ........................ 242/107.4
3,908,928 9/1975 Okada ............................. 242/107.4
4,063,777 12/1977 Takada .............................. 297/477
4,261,531 4/1981 Naitoh ............................ 297/475 X

FOREIGN PATENT DOCUMENTS 2723295 12/1978 Fed. Rep. of Germany.
2844553 5/1979 Fed. Rep. of Germany.

Primary Examiner—Stuart S. Levy
Assistant Examiner—Scott J. Haugland
Attorney, Agent, or Firm—Brumbaugh, Graves, Donohue & Raymond

[57] ABSTRACT

A safety device for vehicles includes a safety belt for restraining a passenger in a normal position in a seat. A winder is attached to one end of the safety belt and winds the end of the belt onto a winding roller. A blocking device is actuated to prevent the winder from rewinding the belt when the passenger remains in the normal position in the seat and the belt is buckled. A release is provided for disconnecting the blocking device from the locking position when an excessive amount of slack develops in the belt, so that the winder can take up the excessive slack.

3 Claims, 3 Drawing Figures

SAFETY DEVICE FOR VEHICLES

BACKGROUND OF THE INVENTION

This invention relates to a safety device for a vehicle, and more particularly, to a device for adjusting the slack in an automobile safety belt.

In a typical seat belt or shoulder belt device, the belt is pulled out from its rewound position when worn by the passenger. Accordingly, when such a belt is worn there is always a return mechanism pulling on the belt and applying an uncomfortable force against the wearer. German Offenlegungsschrift 27 23 295 discloses a safety belt for a passenger in which, after the belt is pulled out and buckled, the rewind mechanism locks to prevent rewinding of the belt. While this makes the belt more comfortable to wear, an unacceptably large belt slack can occur if the safety belt is pulled out too far when buckled or thereafter while the passenger is sitting. If such slack occurs, the safety belt is thus not completely effective in case of a vehicle accident.

SUMMARY OF THE INVENTION

It is a purpose of the present invention to provide a safety belt in which the belt rewind mechanism is blocked when the belt is applied and in which only a safe amount of belt slack is permitted. In the event that an excessive amount of belt slack occurs, the blocking means, which otherwise prevents rewinding of the belt when the passenger is in a normal sitting position and the safety belt has been buckled, is disconnected. A winding spring included in the winder then takes up the excess belt slack.

A release in accordance with the invention includes, in a further refinement, means which can be coupled to a winding roller when the blocking means is connected and which, on rotation of the winding roller by a predefined angle in an unwinding direction, (i.e. after the belt has been buckled), actuates a release switch to disconnect the blocking means. Thus, excessively large belt slack caused by the unwinding of a belt band from the winding roller when the blocking means is engaged is safely taken up.

The blocking means eliminates uncomfortable belt pull in a normal sitting position, thereby contributing to comfortable use of the safety belt. When the passenger has put on the belt and is in a normal sitting position, a release device in accordance with the invention permits the safety belt to unwind from a winding roller up to a predetermined amount of slack before the blocking means is disabled, thereby permitting the belt to rewind. When the maximum amount of belt slack is exceeded, the blocking means is disconnected by a release so that a belt winding spring acts on the belt winding device to take up the slack. After the blocking means has been thus disabled, the operation of the blocking means resumes only after the belt is buckled again or after the passenger bends forward.

BRIEF DESCRIPTION OF THE DRAWINGS

A more complete understanding of the invention and its advantages will be apparent from the following detailed description taken in conjunction with the accompanying drawings in which.

DESCRIPTION OF THE PREFERRED EMBODIMENT

Figure 1:
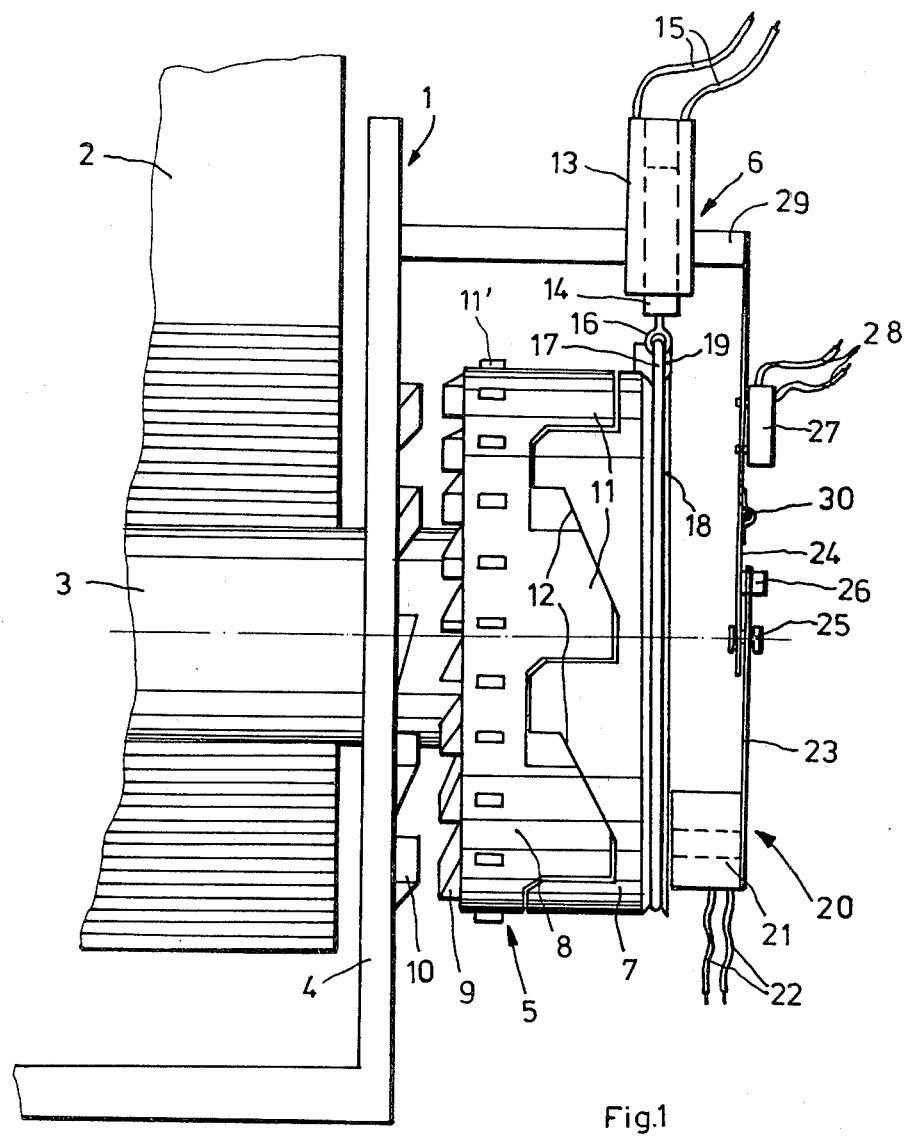
FIG. 1 is a side view of a belt winding device with a blocking device and a release device in accordance with the invention.

The safety belt mechanism shown has a winder 1 with a safety belt 2 wound on a winding roller 3 to form a belt roll. The roller 3 is loaded by a spring, not shown in the figure. The safety belt 2 is designed, as is known, to restrain a passenger sitting on a seat of a vehicle, in particular, a passenger automobile. The winding roller 3 rotates in a housing 4, only a part of which is shown, and is rigidly fixed in a known manner to the vehicle body.

A locking device 5 is integrated with the winder 1 such that when the vehicle accelerates or decelerates rapidly, or the belt is rapidly pulled out, the device 5 engages to lock the winder 1 in the unwinding direction of the belt. A blocking means 6 locks the winder 1 in the rewinding direction when engaged.

The locking device 5 comprises a locking plate 7 rigidly connected to the winding roller 3 and a toothed disk 8 which is axially movable on roller 3 relative to the locking plate 7. The toothed disk 8 is provided on the side facing away from the locking plate 7 with teeth 9 which cooperate with teeth 10 on a side face of the winding housing 4 to secure the toothed disk 8 to the housing 4. Toothlike projections 11 extend at the other end face of the toothed disk 8 and engage recesses in the locking plate 7. The locking plate 7 has abutting surfaces 12 which extend at an inclination relative to a peripheral direction. The periphery of the toothed disk 8 includes another set of teeth 11' which engage a ratchet pawl (not shown) which, in a conventional arrangement, are acted on by an inertia pendulum. When the vehicle is in a markedly inclined position, or when a large acceleration acts on the inertia pendulum, the ratchet pawl is displaced by the inertia pendulum to engage the teeth, and thereby to lock the belt. Details of the illustrated locking device 5 and its operation are generally known.

The blocking means 6 in the illustrated embodiment comprises a belt brake which can be actuated by an electromagnet 13. The electromagnet 13 is activated by electric current supplied through connecting cables 15. An armature 14 associated with the electromagnet 13 has an eye 16 at its end which is fastened to a brake cable 17. The brake cable 17 is looped around a brake disk fixed on an end face of the locking plate 7 and is fixed to an anchor 19.

Figure 2:
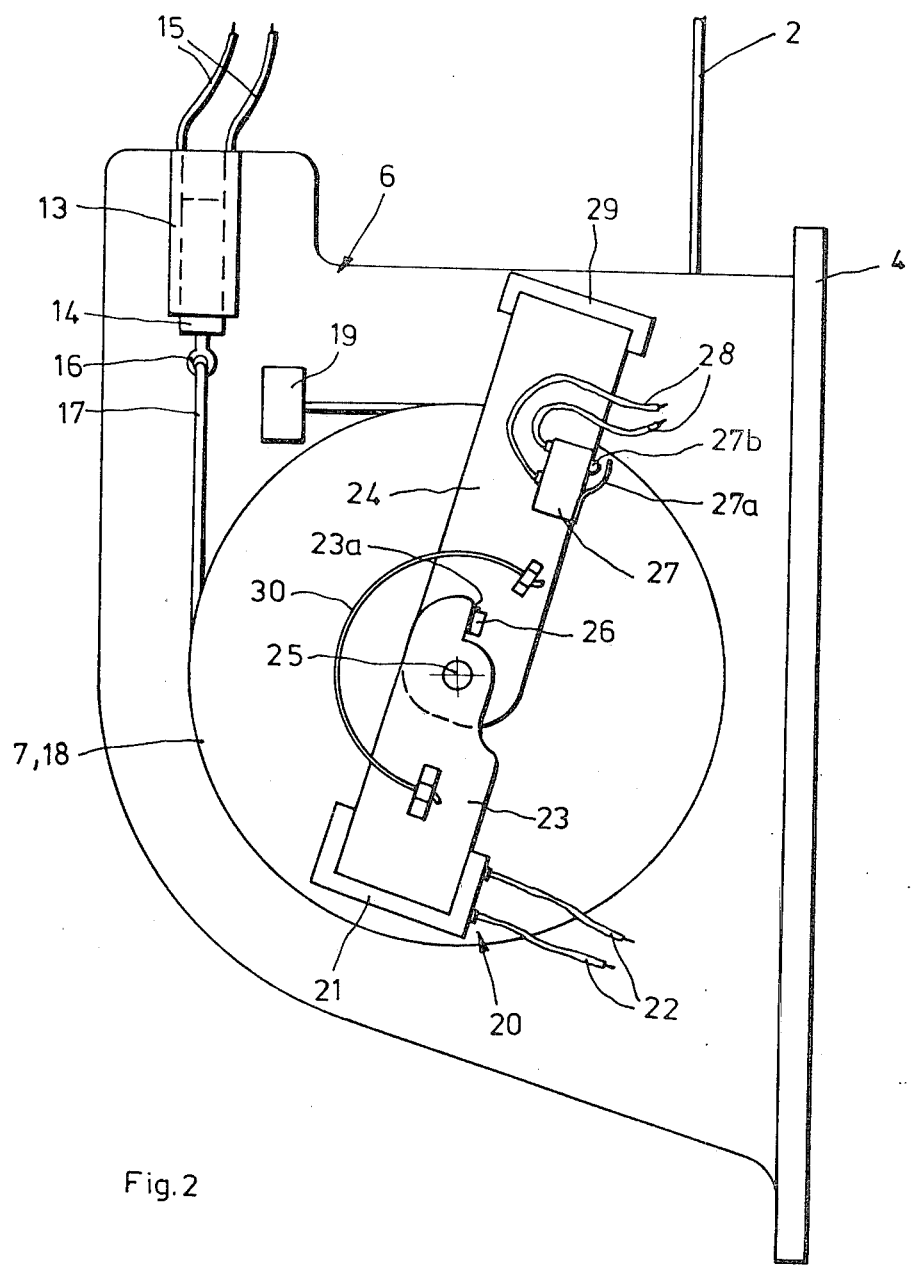
FIG. 2 is an end view of the belt winding device of FIG. 1.

When the brake magnet 13 is supplied with current, the armature 14 is drawn inwardly so that the brake cable 17 is pulled tightly around the brake disk 18 to block the rewinding of the belt strap 2 onto the winding roller 3 by the winding spring. The blocking means 6 is arranged so that when it operates, the braking action is further aided by the belt winding spring, which pulls the brake cable 17 in the same direction as the armature 14. Thus the cable 17 is pulled tight against the pulley disk 18 by the combined armature force and belt winding force. In the unwinding direction, i.e., when the locking plate 7 and the winding roller 3 turn counterclockwise as seen in FIG. 2, the brake cable 17 is pulled open so that rotation of the winding roller in this direction is possible with an increase in belt slack, even if the blocking means 6 is connected.

In order to avoid an unacceptably large belt slack, a release 20 is provided to disconnect the blocking means 6 when the winding roller unwinds by a predefined angle. A lever 23, which is connected to the locking plate 7 only when the blocking means 6 is engaged (i.e. after the belt is initially pulled out and buckled by the normally seated passenger), pivots about a center-axis bearing 25 and has an electromagnet 21 with electric lead-ins 22 opposite the pivot. The electromagnet 21 has an armature arranged to engage the locking plate 7 when the electromagnet 21 is energized. The lever 23 is connected to a stationary support 24 which can bend only in the direction of the axis of the winding roller 3 and which, in turn, is rigidly attached to a holding bracket 29. A switch 27, with switch contacts 27a and 27b and electric lead-ins 28, is attached to the support 24 and arranged such that, at such times as the lever 23 is connected to the blocking plate 7, rotation of the blocking plate 7 causes the lever 23 to rotate into engagement with contact 27a to close the switch 27. A restoring spring 30 has one end attached to the support 24 and the other end attached to the pivoting lever 23. The spring 30 moves the lever 23 into a start position in which a stop dog 23a attached to the lever 23 contacts a stop 26 provided on the support 24.

Figure 3:
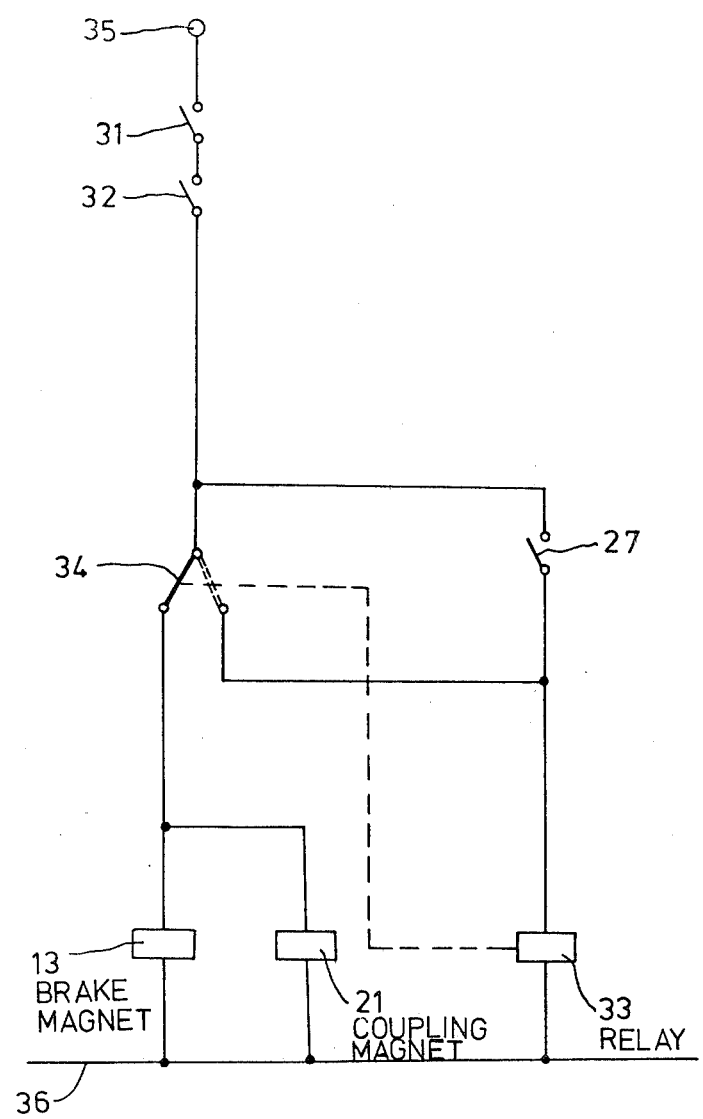
FIG. 3 is a schematic for a circuit for actuating the blocking device and the release device of the present invention.

The circuit diagram in FIG. 3 indicates that the coupling magnet 21 is connected in parallel with the brake magnet 13 so that both magnets 13,21 are simultaneously energized and de-energized. Two series connected switches 31 and 32 are positioned in the circuit connecting the two magnets 13,21 between the positive pole 35 and the negative pole 36 of the vehicle electrical system. The first switch 31 is dependent upon the position of the belt lock or buckle associated with the safety belt and is closed when the safety belt has been put on. The second switch 32 is arranged in the backrest of the associated vehicle seat. In the normal sitting position for a passenger, i.e., when the passenger leans back lightly on the backrest of the seat, the switch 32 is closed. A switch 34 is connected between the switches 31, 32 and will be described more fully below.

During such time as the belt is being buckled, one or both of the switches 31, 32 will be open. Accordingly, while the belt is being attached, excess slack in the belt will be taken up by the rewind spring, since the blocking means 6 is not actuated. Also, the blocking device disabling lever 23 will remain in the position shown in FIG. 2, since the locking plate 7 is disengaged from, and can rotate freely relative to, the lever 23 since the electromagnet 21 is not energized.

Once the belt is buckled, both the belt lock switch 31 and the backrest switch 32 are closed. The switch 34 will initially be in the position indicated by the full lines so that the two magnets 13 and 21 are energized. The blocking means 6, which in this embodiment is a cable brake, is connected to block the winder 1 from further rewinding. At the same time, the coupling magnet 21 rigidly connects the lever 23 to the locking plate 7 which in turn is connected to the winding roller 3.

Thereafter, if the belt band 2 is pulled to unwind, which would now represent slack being introduced, the winding roller 3, locking plate 7, and lever 23 turn in a counterclockwise direction as seen in FIG. 2. As the belt is pulled further, the lever 23 continues its rotation with the locking plate 7 until the lever 23 engages and actuates the switch 27 by connecting the contacts 27a and 27b. Closing of the switch 27, as seen in FIG. 3, actuates a relay 33 connected in parallel with the magnets 13 and 21 as well as with the switch 34. The relay 33 moves the switch 34 from the position shown in full lines to the position shown in broken lines, in which the relay 33 continues to be supplied with current via the self-holding circuit shown.

Thus, following actuation of the switch 27, both the brake magnet 13 and the coupling magnet 21 are de-energized so that both the blocking means 6 and the release device 20 are disconnected. The brake cable 17 is released so that the winding spring rotates the winding drum to apply a winding force to the belt band 2. At the same time, the lever 23 returns to its starting position by the action of the spring 30. Although the switch 27 is again opened when the lever 23 rotates toward its starting position, the relay 33 remains energized, and thus the blocking means 6 remains disconnected until one of the switches 31 or 32 is opened, which may be due either to the unbuckling of the safety belt or the leaning forward of the passenger from a normal sitting position, so that the self-holding circuit of the relay 33 is interrupted. The relay 33 then releases the switch 34 to its starting position, as indicated by the solid lines in FIG. 2.

While only one embodiment of the present invention has been described in detail herein and shown in the accompanying drawings, it should be evident that various further modifications are possible without departing from the spirit and scope of the invention, and such modifications are intended to be included within the scope of the appended claims.

I claim:

1. A safety device for a vehicle comprising:
   (a) a safety belt for restraining a passenger in a normal position in a seat and capable of being attached to a belt lock means;
   (b) winding means, attached to one end of said safety belt, including a winding roller rotatable about an axis and means for rewinding said end of said belt onto said winding roller;
   (c) detection means for detecting when a passenger is in said normal position in said seat and when said safety belt is coupled to said belt lock means;
   (d) blocking means associated with said winding means and responsive to said detection means for blocking said winding means from rewinding said belt when said passenger remains in said normal position in said seat; and
   (e) release means including means for detecting when a predetermined length of said belt is unwound from said winding means for disabling said blocking means when said predetermined length of said belt has been unwound, thereby permitting rewinding of said belt, wherein said release means includes:
   a release switch for disabling said blocking means; and
   means for actuating said release switch comprising a lever pivotable about said roller axis; means for selectively coupling said lever to said winding roller when said blocking means is in a blocking condition for rotating with said roller, wherein the coupling means comprises electromagnet means connected to said lever for coupling said lever to said blocking means; and means responsive to the rotation of said lever through a predetermined angle for actuating said release switch.

2. The device of claim 1 and further comprising:
   a stop engaging said lever when said lever is in a start position; and
   a restoring spring for urging said lever into said start position.

3. The device of claim 1, wherein said blocking means is electrically actuated, and further comprising:
   a first circuit for supplying current to said blocking means and said electromagnet means;
   a first switch arranged in said first circuit for opening said circuit;
   a relay means responsive to the closing of said release switch for activating said first switch to open said first circuit and thereby disable said blocking means and said electromagnet means; and
   a relay locking circuit closed by the actuation of said relay means for supplying current to said relay means for holding said relay closed.

* * * * *